April 9, 1940.  W. L. MORRISON  2,196,225
BUMPER DEVICE FOR AUTOMOTIVE VEHICLES
Filed May 3, 1937  4 Sheets-Sheet 1
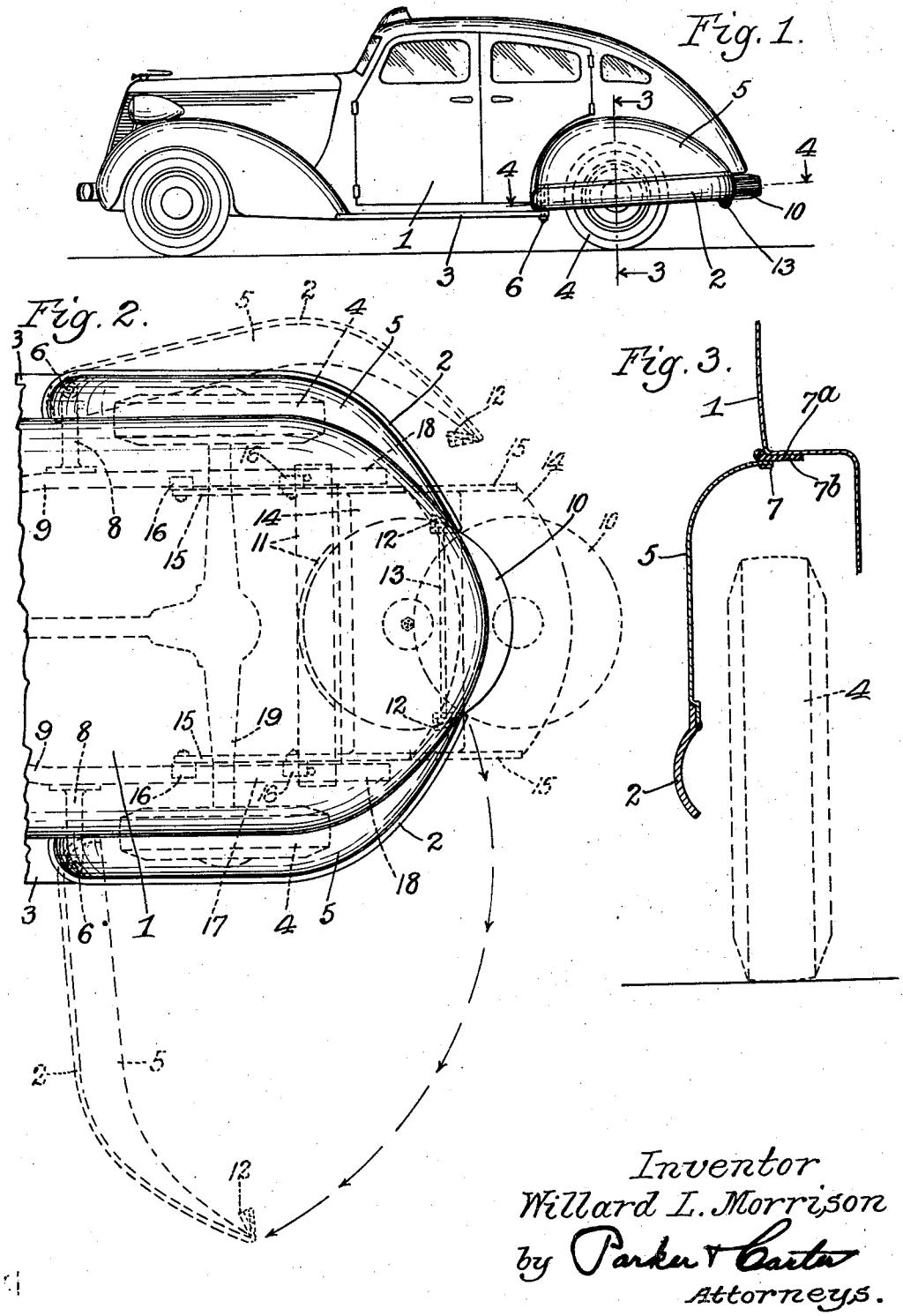
Inventor
Willard L. Morrison
by Parker & Carter
Attorneys.

Inventor
Willard L. Morrison
by Parker & Carter
Attorneys.

Inventor
Willard L. Morrison
by Parker & Carter
Attorneys.

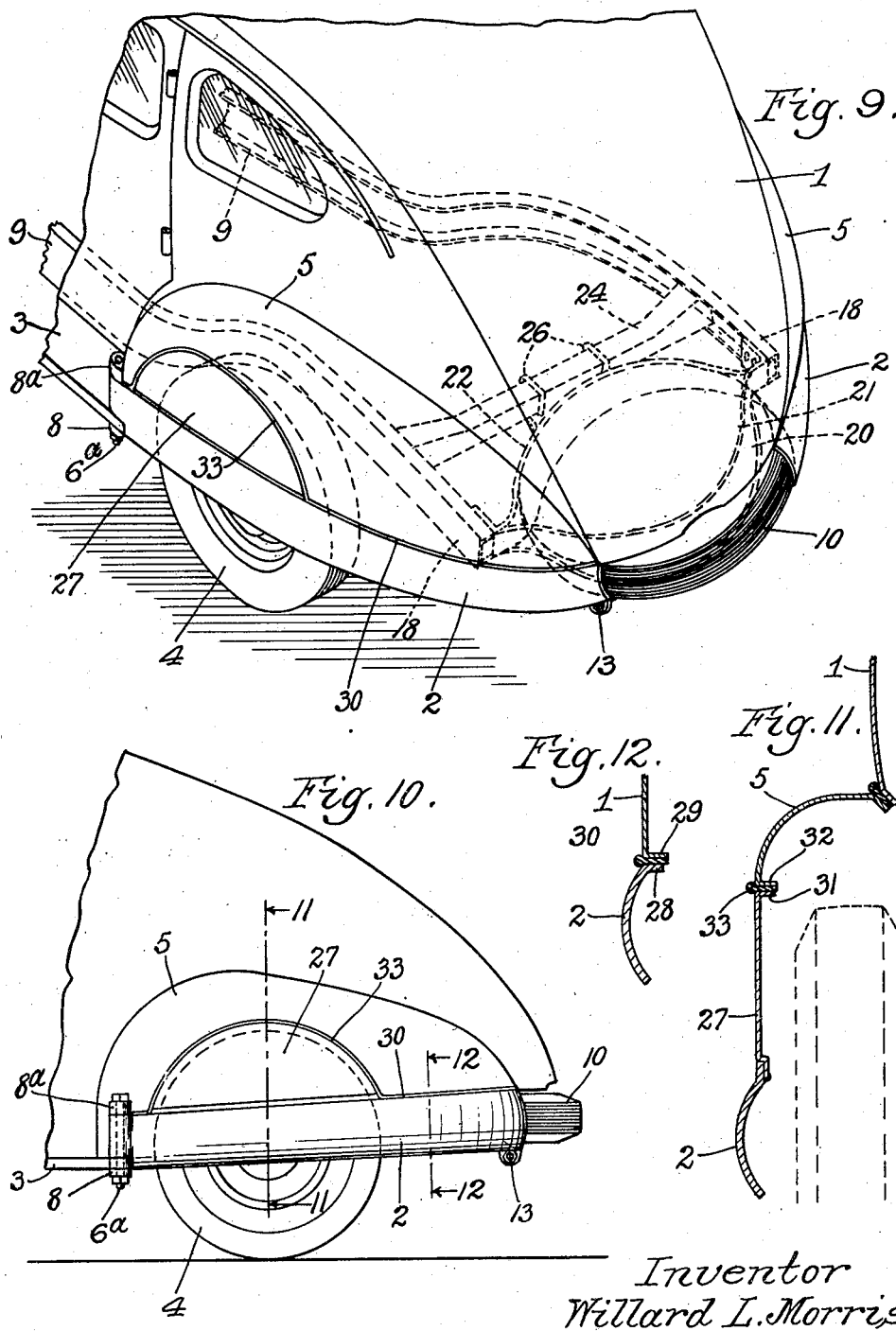

Patented Apr. 9, 1940

2,196,225

UNITED STATES PATENT OFFICE 2,196,225

BUMPER DEVICE FOR AUTOMOTIVE VEHICLES

Willard L. Morrison, Lake Forest, Ill.

Application May 3, 1937, Serial No. 140,313

9 Claims. (Cl. 293—55)

This invention relates to improvements in bumper devices for automotive vehicles and has for its object to provide a new and improved device of this description. The invention has as a further object to provide a bumper device wherein the spare tire is used to take the shocks. The invention has as a further object to provide a resilient shock absorbing device which projects from the body of the vehicle, but which has portions which project into a receiving space in the body of the vehicle.

The invention has as a further object to provide a bumper device wherein a tire, either the spare tire or a tire for the purpose, is attached to the vehicle and has a portion projecting from the vehicle to act directly to receive blows from the rear. The invention has as a further object to provide a device of the kind described wherein the tire not only receives blows from the rear, but receives blows directed toward the rear wheels or fenders of the vehicle.

The invention has as a further object to provide a bumper device wherein shocks due to blows on a rear portion of the sides of the vehicle will be transmitted to a shock absorbing device at the end of the body of the vehicle.

The invention has as a further object to provide a bumper device having portions which extend longitudinally along the vehicle opposite the wheels and a portion intermediate the longitudinally extending portions, the latter portion having shock absorbing qualities. The invention has as a further object to provide a bumper device having portions which extend longitudinally along the vehicle past the wheels thereof, and to which the fenders are connected, these portions being movable so that the fenders may be moved to expose the wheels and portions of the frame, so that the wheels can be easily removed to replace the tires. The invention has as a further object to provide a bumper device which also acts to prevent the tires and wheels from being removed by unauthorized persons. The invention has as a further object to provide a bumper device having portions which extend longitudinally along the vehicle on opposite sides thereof, past one pair of wheels thereof, and enclosing said wheels, said portions being movably connected to the vehicle and having free ends, a tire projecting from the end of the vehicle between said free ends, and means for fastening said free ends so that the two end wheels and the tire projecting from the end will be enclosed so that they cannot be removed by unauthorized persons.

The invention has other objects which are more particularly pointed out in the accompanying description.

Referring now to the drawings,

Fig. 1 is a view showing an automobile provided with one form of bumper device embodying the invention;

Fig. 2 is an enlarged plan view of the rear end of the automobile shown in Fig. 1, showing various of the parts in different positions in dotted lines;

Fig. 3 is an enlarged sectional view taken on line 3—3 of Fig. 1, showing the wheel in dotted lines;

Fig. 9 is a perspective view of the rear end of an automobile supplied with the form of invention illustrated in Fig. 7;

Fig. 10 is a side view of the rear end of the automobile illustrated in Fig. 9;

Fig. 11 is an enlarged sectional view taken on line 11—11 of Fig. 10, showing the wheel in dotted position; and Fig. 12 is an enlarged sectional view taken on line 12—12 of Fig. 10.

Like numerals refer to like parts throughout the several figures.

Figure 4:
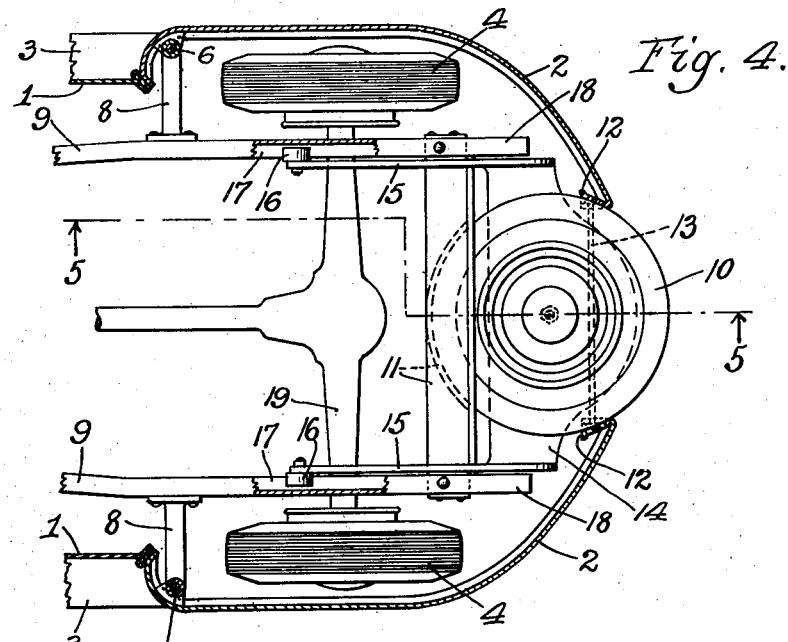
Fig. 4 is an enlarged sectional view taken on line 4—4 of Fig. 1.
Figure 5:
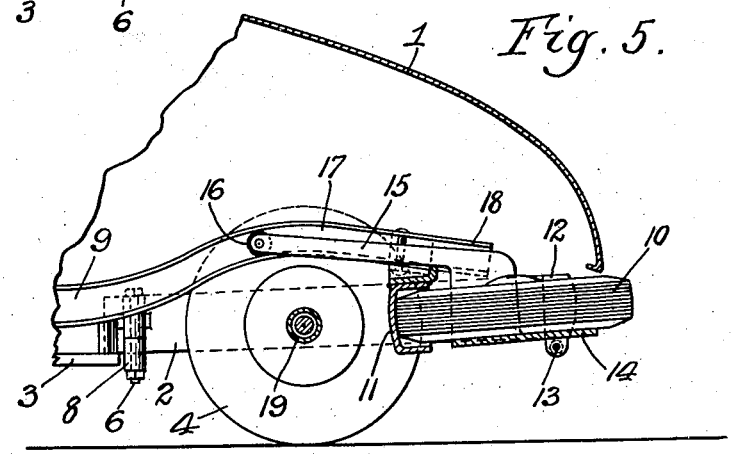
Fig. 5 is a sectional view taken on line 5—5 of Fig. 4, with parts broken away.

In the drawings I have illustrated the bumper device as being arranged at the rear of the automobile, but it is of course evident that it may be arranged at the front of the automobile, or both at the rear and the front, and I therefore do not limit myself to the location of the device.

Referring now to the drawings, I have illustrated an automobile 1 provided with a bumper device embodying the invention. In this construction there are two bumper elements 2 which extend longitudinally of the automobile along the rear wheels 4 and the fenders 5. These bumper elements are a part of the fenders 5 which are connected therewith, as shown in Fig. 3. These bumper elements and the fenders are movably connected to the automobile at one end, as for example, the end nearest the middle of the automobile and this movable connection is preferably a pivotal connection, the bumper elements being mounted upon the pivots 6. This pivotal connection may be arranged in any desired manner and I have illustrated in Figs. 1 to 5 one construction wherein there is a supporting member 8 for each pivot, which are attached to the frame 9 of the automobile and which project outwardly therefrom. The pivots 6 are supported by these supporting members 8. The lower ends of the pivots may pass through the running board 3 if desired. Since these bumper elements and the fenders move, there must be a movable connection between the fenders and the body of the automobile. As herein shown, see Fig. 3, the upper portion 7 of the fenders is located under the bent portions 7a of the body and there is a packing member 7b between them, which prevents injury or defacement of the body and the fenders.

Figure 6:
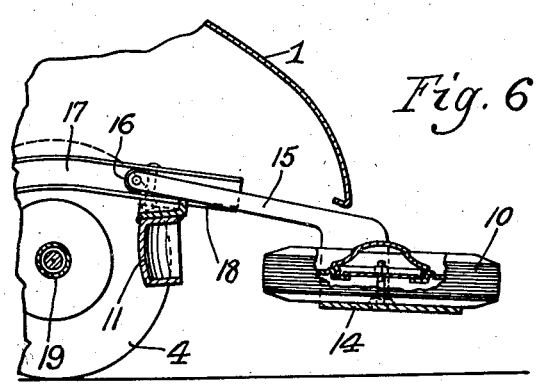
Fig. 6 is a view similar to Fig. 5, showing the bumper tire in position to be removed.

The ends of the bumper elements farthest from the middle of the automobile are arranged so that any shock thereon, due to a blow, is transmitted to a resilient shock absorbing device at the end of the body. This resilient shock absorbing device is preferably a pneumatic shock absorbing device and may be a pneumatic tire 10, being preferably the pneumatic tire of the spare wheel or spare tire. This pneumatic tire fits in between the ends of the bumper elements 2 and is preferably prevented from moving inwardly toward the middle of the body by the stop device 11. The resilient shock absorbing device preferably projects beyond the ends of the bumper elements 2 so that it directly takes blows from the rear so as to resiliently resist the shocks due to such blows. The ends of the bumper elements 2 are preferably arranged with portions 12 which engage the tire 10 and which preferably have a comparatively large engaging face area so as not to injure the tire. This engaging face is also preferably the shape of the tire, that is preferably has a curved face which accurately fits the curved face of the tire. The ends of the bumper elements are connected together by a connecting device 13 which permits relative movement between the bumper elements and the tire and between the ends of the bumper elements, when the bumper elements are struck, or either of them, but which prevents the ends of the bumper elements from being moved away from the tire. This device may be of any construction to accomplish this purpose, such as a flexible device, or a spring device, or a combined rigid and spring device, or a rigid and flexible device. In the construction shown, for example, in Figs. 4, 5 and 6, the tire is supported upon a supporting member 14 which extends under the tire and associated parts and which is provided with the arms 15, one on each side. These arms have engaging portions 16 which engage and run along guides 17, which guides may be the frame portions of the automobile. In the particular construction shown, the engaging parts 16 are illustrated as rollers which fit into grooves in the guides 17. When it is desired to remove the tire 10 or replace it, it is only necessary to separate the bumper elements 2, as shown for example in dotted lines in Fig. 2, whereupon the tire may be pulled out to the position shown, for example in Fig. 6, where it can be easily removed or replaced. When the tire is in position on the support it is only necessary to push it toward the body of the automobile, until its movement is stopped by the stop 11.

In the construction where the fenders are connected with and move with the bumper elements 2, it will be seen that by moving the ends of the bumper elements outwardly, as shown for example in dotted lines in Fig. 2 and particularly at the bottom side of Fig. 2, it will be seen that not only the tire 10 but the wheels 4 are made easily accessible and the frame end portion 18 of the automobile and the axle 19 of the wheels are made readily accessible for the application of a jack or screw, so that the wheels can be raised so that they can be easily removed and replaced. With the present construction of automobiles, these parts are practically inaccessible for the jack. Furthermore, with the construction where the fenders are attached to the bumper elements, it will be seen that if one or more of the fenders should be bent or injured, it can be easily removed and a new fender placed in its position. The injured fender can therefore be fixed without putting the automobile out of use. To remove the fender it is only necessary to remove the pivot which pivotally holds it in position.

Figure 7:
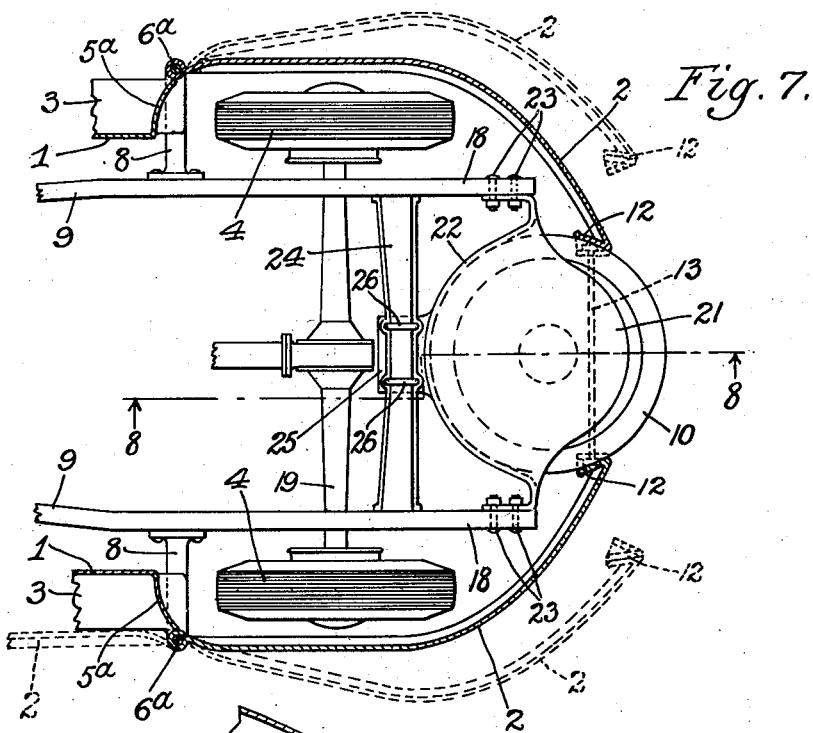
Fig. 7 is a view similar to Fig. 4, showing a modified construction.
Figure 8:
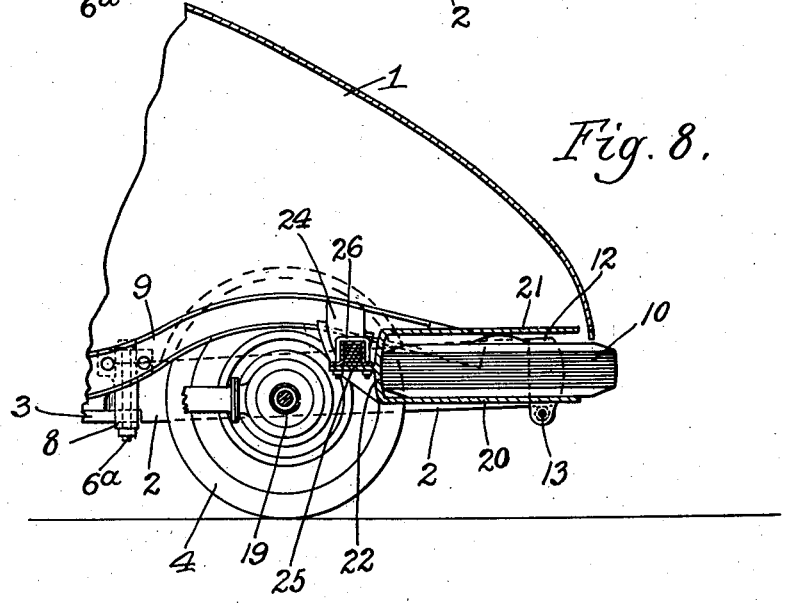
Fig. 8 is a sectional view with parts broken away, taken on line 8—8 of Fig. 7.

In Figs. 7 and 8 I have shown a modified construction wherein the tire 10 and associated parts are received in a tire receptacle which may be of any desired construction. As herein shown, this tire receptacle is formed by providing the two walls 20 and 21 between which the tire is received, the walls being connected together at one edge by the connecting member 22 and being free at the other edge to provide the opening for entrance of the tire. The tire rests on the wall 20 which supports it in position. This tire receptacle may be supported in any desired manner, as by being attached by the fastening devices 23 to the frame 18 of the automobile. The tire receptacle is also preferably connected with the cross member 24 of the automobile frame, the connection being such that the blow on the tire is transmitted to this member. As shown, for example, in Figs. 7 and 8, the connecting member 22 is provided with a lug 25 and this lug is connected by the U-shaped fastening devices 26 with the frame member 24. When it is desired to remove or replace the tire 10, it is only necessary to release the free ends of the bumper elements 2 so that they may be moved apart, whereupon the tire may be easily and quickly pulled out of its receptacle or placed therein. This forms a simple and cheap method of supporting the tire 10 and constitutes the preferred construction for that purpose.

In the construction shown in Figs. 7 and 8 the pivots 6a are somewhat differently arranged and positioned, in that they are at the inner end of the bumper elements and fenders, being located at the point where the section 5a of the fender meets the other portion of the fender, as clearly shown in Figs. 7 and 8. In this construction there is a support 8 connected with the frame member 9, the pivots 6a being connected to this support 8, and a support 8a may be secured to the fender.

The ends of the bumper elements preferably engage the tire at a point beyond its center so that when in position, the tire cannot be removed. The bumper elements and fenders form housing members for the wheels and the spare tire.

In all of these constructions heretofore explained, it will be seen that the fenders and bumper elements when their ends are fastened together, form enclosing safety devices which enclose the tire 10 and the wheels 4 so that neither of them can be stolen, or removed or tampered with by unauthorized persons. The two ends of the bumper elements may be locked together by the connecting device 13 or by a separate locking device to prevent the tire and wheel from being stolen.

In Figs. 9 to 12 inclusive I have shown a still further modification. In this construction the bumper elements 2 are separated from the fenders 5 but are pivoted by the pivots 6a as in the other figures. Attached to the bumper elements 2 are the covers 27 which cover the opening in the fender through which the wheel passes. In this construction the upper edge of the bumper element is bent inwardly as shown at 28 and the lower edge of the body is bent inwardly as shown at 29, and there is a cushion member 30 in between them which prevents the rubbing of the parts to injure them and also prevents rattling, see Fig. 12. As herein shown the upper edge of the cover 27 is bent inwardly at 31 and the body portion is bent inwardly at 32 and there is a cushion member 33 between them for preventing injurious rubbing and for preventing rattling.

I have described in detail a particular construction embodying the invention, but it is of course evident that the parts may be varied in many particulars without departing from the spirit of the invention as embodied in the claims hereto appended and I therefore do not limit myself to the particular constructions shown.

I claim:

1. A bumper device for automotive vehicles comprising a bumper element extending longitudinally of the body of the vehicle and movably connected at one end thereto, the other end being free, a pneumatic tire mounted upon said vehicle and having a portion thereof projecting beyond the vehicle, to receive blows, the free end of said bumper element, when the bumper element is struck, transmitting the shock to said tire, and means for holding said tire in its blow-resisting position.

2. A bumper device for automotive vehicles comprising a pair of bumper elements extending longitudinally of the body of the vehicle and movably connected at one end thereto, the other ends being free, a pneumatic tire mounted upon said vehicle intermediate the free ends of said bumper elements and having a portion thereof projecting beyond the vehicle, to receive blows, the free ends of said bumper elements, when the bumper elements are struck, transmitting the shock to said tire, and means for holding said tire in its blow-resisting position.

3. A bumper device for automotive vehicles comprising a pair of bumper elements extending longitudinally of the body of the vehicle and movably connected at one end thereto, the other ends being free, a pneumatic tire mounted upon said vehicle intermediate the free ends of said bumper elements and having a portion thereof projecting beyond the vehicle, to receive blows, the free end of said bumper elements, when the bumper elements are struck, transmitting the shock to said tire, means for holding said tire in its blow-resisting position, and a connection between the free ends of said bumper elements.

4. A bumper device for automotive vehicles comprising a pair of bumper elements extending longitudinally of the body of the vehicle and movably connected at one end thereto, the other ends being free, a pneumatic tire mounted upon said vehicle intermediate the free ends of said bumper elements and having a portion thereof projecting beyond the vehicle, to receive blows, the free end of said bumper elements, when the bumper elements are struck, transmitting the shock to said tire, means for holding said tire in its blow-resisting position, and a connection between the free ends of said bumper elements, said connection permitting the ends of said bumper elements to move relatively when either one of them is struck.

5. A bumper device for automotive vehicles comprising a bumper element extending longitudinally of the body of the vehicle, a fender connected with said bumper element, the bumper element and fender being movably connected at one end to the vehicle, the other end of the bumper element being free, a pneumatic tire supported upon said vehicle and projecting from the end thereof, said free end of the bumper element being in proximity to said tire, so that the tire resists blows upon said bumper element, and means for holding said tire in its blow-resisting position.

6. A bumper device for automotive vehicles comprising a pair of bumper elements on opposite sides of the vehicle and extending longitudinally of the body of the vehicle, a fender connected with each of said bumper elements, the bumper elements and the fenders being movably connected at one end with the vehicle, the other ends of the bumper elements being free, a pneumatic tire supported upon the vehicle and projecting from the end thereof and located intermediate the free ends of said bumper elements, so that blows upon either bumper element are transmitted to said tire, and means for holding said tire in its blow-resisting position.

7. A bumper device for automotive vehicles comprising a pair of bumper elements on opposite sides of the vehicle and extending longitudinally of the body of the vehicle, a fender connected with each of said bumper elements, the bumper elements and the fenders being movably connected at one end with the vehicle, the other ends of the bumper elements being free, a pneumatic tire supported upon the vehicle and projecting from the end thereof, and located intermediate the free ends of said bumper elements, so that blows upon either bumper element are transmitted to said tire, means for holding said tire in its blow-resisting position, and a connection between the free ends of said bumper elements, which holds the bumper elements in proximity to said tire and permits them to move relatively when either one is struck.

8. A device of the kind described, comprising a pair of housing members for two of the opposed wheels on the vehicle, said housing members covering the top and a portion of the sides of the wheels and hinged in position at one end and having their other ends free, means for connecting the free ends together so that the housing members prevent the removal of said wheels, said means comprising an adjustable member which permits said free ends to move toward and away from each other, said free ends when released, permitting the wheel housings to be moved outwardly to expose the wheels and permit them to be removed.

9. A bumper device for automotive vehicles comprising a part extending in a generally longitudinal direction of the vehicle and a pneumatic tire mounted on the vehicle, the part extending in a generally longitudinal direction of the vehicle engaging the periphery of the tire so as to transmit blows received by said part to the periphery of said pneumatic tire.

WILLARD L. MORRISON.